(12) United States Patent
Ma et al.

(10) Patent No.: US 12,384,264 B2
(45) Date of Patent: Aug. 12, 2025

(54) WAKE-UP CIRCUIT FOR CHARGE CONTROLLER, ON-BOARD CHARGER, AND NEW ENERGY VEHICLE

(71) Applicant: Huawei Digital Power Technologies Co., Ltd., Shenzhen (CN)

(72) Inventors: Bin Ma, Dongguan (CN); Xiaoqiu Li, Dongguan (CN); Chen Chen, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 672 days.

(21) Appl. No.: 17/733,824

(22) Filed: Apr. 29, 2022

(65) Prior Publication Data
US 2022/0250494 A1    Aug. 11, 2022

(30) Foreign Application Priority Data
Apr. 30, 2021    (CN) .......................... 202110483741.X

(51) Int. Cl.
*B60L 53/22*    (2019.01)
*B60L 53/53*    (2019.01)
*B60L 58/12*    (2019.01)

(52) U.S. Cl.
CPC ............... *B60L 53/22* (2019.02); *B60L 53/53* (2019.02); *B60L 58/12* (2019.02)

(58) Field of Classification Search
CPC .......... B60L 53/22; B60L 53/53; B60L 58/12; B60L 53/20; Y02T 10/70; Y02T 10/7072; H02M 7/12; H02M 1/36

USPC ....................................................... 320/128
See application file for complete search history.

(56) References Cited

U.S. PATENT DOCUMENTS

2021/0305833 A1*    9/2021    Marcos Pastor .. H02J 7/007182

FOREIGN PATENT DOCUMENTS

| CN | 106160090 A | 11/2016 |
|---|---|---|
| CN | 205846798 U | 12/2016 |
| CN | 103475072 B | 4/2017 |
| CN | 110254378 A | 9/2019 |
| CN | 110450654 A | 11/2019 |
| CN | 111959307 A | 11/2020 |

(Continued)

*Primary Examiner* — Paul Dinh
(74) *Attorney, Agent, or Firm* — Leydig, Voit & Mayer, Ltd.

(57) ABSTRACT

A wake-up circuit for a charge controller is provided, which includes a first-stage charging circuit and a second-stage charging circuit. The first-stage charging circuit includes a first capacitor. When an input terminal of the first-stage charging circuit receives a high level signal and the first capacitor is in a partially charged state, the first-stage charging circuit charges the first capacitor and outputs a first charging voltage to the second-stage charging circuit. When the input terminal of the first-stage charging circuit receives a low level signal, the first-stage charging circuit discharges the first capacitor. The second-stage charging circuit includes a second capacitor. When the second-stage charging circuit receives the first charging voltage output by the first-stage charging circuit, the second-stage charging circuit charges the second capacitor and outputs a wake-up signal to the charge controller, thereby increasing a scenario coverage of the wake-up circuit to ensure high applicability.

17 Claims, 6 Drawing Sheets

(56) References Cited

FOREIGN PATENT DOCUMENTS

WO          2021148631   A1     7/2021
WO          2022198673   A1     9/2022

\* cited by examiner

WAKE-UP CIRCUIT FOR CHARGE CONTROLLER, ON-BOARD CHARGER, AND NEW ENERGY VEHICLE

CROSS-REFERENCE TO RELATED APPLICATIONS

This application claims priority to Chinese Patent Application No. 202110483741.X, filed on Apr. 30, 2021, which is hereby incorporated by reference in its entirety.

TECHNICAL FIELD

Embodiments of this application relate to the field of electronic circuit technologies, and in particular, to a wake-up circuit for a charge controller, an on-board charger, and a new energy vehicle.

BACKGROUND

An on-board charger (OBC) is also referred to as an on-board charger. As shown in FIG. 1a, the on-board charger is configured to convert an alternating current from an alternating current charging pile into a direct current, to charge a high-voltage vehicle battery in a new energy vehicle. A charge controller in the on-board charger is powered by a low voltage battery. A wake-up circuit is usually disposed between the alternating current charging pile and the charge controller, to reduce power consumption of the low voltage battery and increase idle time of the vehicle when the on-board charger is not working. The wake-up circuit is configured to generate a rising edge starting from 0 based on a CP signal sent by the alternating current charging pile. The rising edge is used to wake up the charge controller, so that the charge controller charges the high-voltage vehicle battery based on a charging control signal sent by the alternating current charging pile.

In a current conventional technology, a wake-up circuit for a charge controller shown in FIG. 1b is used. When a CP signal is 0, a voltage at an output terminal of the wake-up circuit is 0 V. When the CP signal ramps from 0 to a high level, the high level charges a capacitor C1. Therefore, the output terminal of the wake-up circuit generates a rising edge starting from 0 V, and the rising edge is used to wake up the charge controller. However, when the initial CP signal is at a high level, and the capacitor C1 is in a fully charged state, the output terminal of the wake-up circuit is at a high level. When the CP signal changes from the high level to a pulse width modulation (PWM) level, it cannot be ensured that electric energy stored in the capacitor C1 can be completely discharged when the CP signal changes from a high level to a low level. Therefore, the wake-up circuit cannot generate a rising edge signal starting from 0 when the CP signal changes from a low level to a high level. As a result, the charge controller may not be woken up effectively, and applicability is poor.

SUMMARY

This application provides a wake-up circuit for a charge controller, an on-board charger, and a new energy vehicle, to increase a scenario coverage of the wake-up circuit to ensure high applicability.

According to a first aspect, this application provides a wake-up circuit for a charge controller, where the wake-up circuit includes a first-stage charging circuit and a second-stage charging circuit. The first-stage charging circuit includes a first capacitor, an input terminal of the first-stage charging circuit is coupled to an input terminal of the wake-up circuit, and an output terminal of the first-stage charging circuit is coupled to an input terminal of the second-stage charging circuit. When the input terminal of the first-stage charging circuit receives a high level signal and the first capacitor is in a partially charged state, the first-stage charging circuit charges the first capacitor and outputs a first charging voltage to the second-stage charging circuit; or when the input terminal of the first-stage charging circuit receives a low level signal, the first-stage charging circuit discharges the first capacitor. The second-stage charging circuit includes a second capacitor, an output terminal of the second-stage charging circuit is coupled to an output terminal of the wake-up circuit and connected to the charge controller. When the second-stage charging circuit receives the first charging voltage output by the first-stage charging circuit, the second-stage charging circuit charges the second capacitor and outputs a wake-up signal to the charge controller. The charge controller is woken by the wake-up signal, and charges a high-voltage vehicle battery in response to a charging control signal. Further, the wake-up circuit can ensure that the first capacitor is always in a partially charged state regardless of whether a received CP signal changes from an initial low level signal to a high level signal or changes from an initial high level signal to a PWM level signal. Further, a charging effect of the high level signal on the first capacitor helps generate a rising edge signal starting from 0 V when a charging current of the first capacitor is used to charge the second capacitor. This increases a scenario coverage of the wake-up circuit to ensure high applicability.

With reference to the first aspect, in a first possible implementation, the input terminal of the wake-up circuit is connected to an alternating current charging pile, and the wake-up circuit receives the first level signal or the second level signal sent by the alternating current charging pile.

With reference to the first aspect, in a second possible implementation, the first-stage charging circuit further includes a first diode, where an anode of the first capacitor is coupled to an input terminal of the first-stage charging circuit, a cathode of the first capacitor is connected to both the output terminal of the first-stage charging circuit and a cathode of the first diode, and an anode of the first diode is connected to a reference ground. The first diode is configured to form a discharge loop when the first capacitor is discharged.

With reference to the first aspect, in a third possible implementation, the first-stage charging circuit further includes a second diode, a cathode of the second diode is connected to the anode of the first capacitor, and an anode of the second diode is connected to the cathode of the first capacitor. The second switching tube enables the first capacitor to be discharged without a negative voltage.

With reference to the first aspect, in a fourth possible implementation, the first-stage charging circuit further includes a first resistor, one terminal of the first resistor is connected to the anode of the first capacitor, and the other terminal of the first resistor is connected to the input terminal of the first-stage charging circuit. The first resistor makes a current in the wake-up circuit less than a preset current threshold. This can effectively protect each component in the wake-up circuit and prolong a service life of the component.

With reference to the first aspect, in a fifth possible implementation, the first resistor includes N1 resistors connected in series and/or in parallel. It can be understood that a resistance value of the first resistor may be any value, to make the wake-up circuit more flexible and applicable.

With reference to the first aspect, in a sixth possible implementation, the first capacitor includes M1 capacitors connected in series and/or in parallel. It can be understood that a capacitance value of the first capacitor may be any value, to make the wake-up circuit more flexible and applicable.

With reference to the first aspect, in a seventh possible implementation, the second-stage charging circuit further includes a third diode, an anode of the third diode is connected to the input terminal of the second-stage charging circuit, and a cathode of the third diode is connected to both the output terminal of the second-stage charging circuit and an anode of the second capacitor. The third diode can prevent a discharge current from flowing to the first-stage charging circuit when the second capacitor is discharged.

With reference to the first aspect, in an eighth possible implementation, the second-stage charging circuit further includes a second resistor, and two terminals of the second resistor are respectively connected to two terminals of the second capacitor. The second resistor is configured to form a discharge loop of the second capacitor when the second-stage charging circuit does not receive the charging voltage output by the first-stage charging circuit.

With reference to the first aspect, in a ninth possible implementation, the second resistor includes N2 resistors connected in series and/or in parallel. It can be understood that a resistance value of the second resistor may be any value, to make the wake-up circuit more flexible and applicable.

With reference to the first aspect, in a tenth possible implementation, the second capacitor includes M2 capacitors connected in series and/or in parallel. It can be understood that a capacitance value of the second capacitor may be any value, to make the wake-up circuit more flexible and applicable.

With reference to the first aspect, in an eleventh possible implementation, the first level signal is a high level signal in a PWM level signal, and the second level signal is a low level signal in the PWM level signal.

According to a second aspect, this application provides an on-board charger. An input terminal of the on-board charger is connected to an alternating current charging pile, and an output terminal of the on-board charger is connected to a high-voltage vehicle battery. The on-board charger includes the wake-up circuit and the charge controller according to the first aspect, an input terminal of the wake-up circuit is coupled to the input terminal of the on-board charger, and an output terminal of the charge controller is coupled to the output terminal of the on-board charger.

According to a third aspect, this application provides a new energy vehicle. The new energy vehicle includes an on-board charger, a high-voltage vehicle battery, and a low voltage battery, an input terminal of the on-board charger is connected to the low voltage battery, an output terminal of the on-board charger is connected to the high-voltage vehicle battery, and the on-board charger includes the wake-up circuit and the charge controller according to the first aspect.

It should be understood that implementations and beneficial effects of the plurality of aspects of this application may be mutually referenced.

DESCRIPTION OF EMBODIMENTS

Figure 1A:
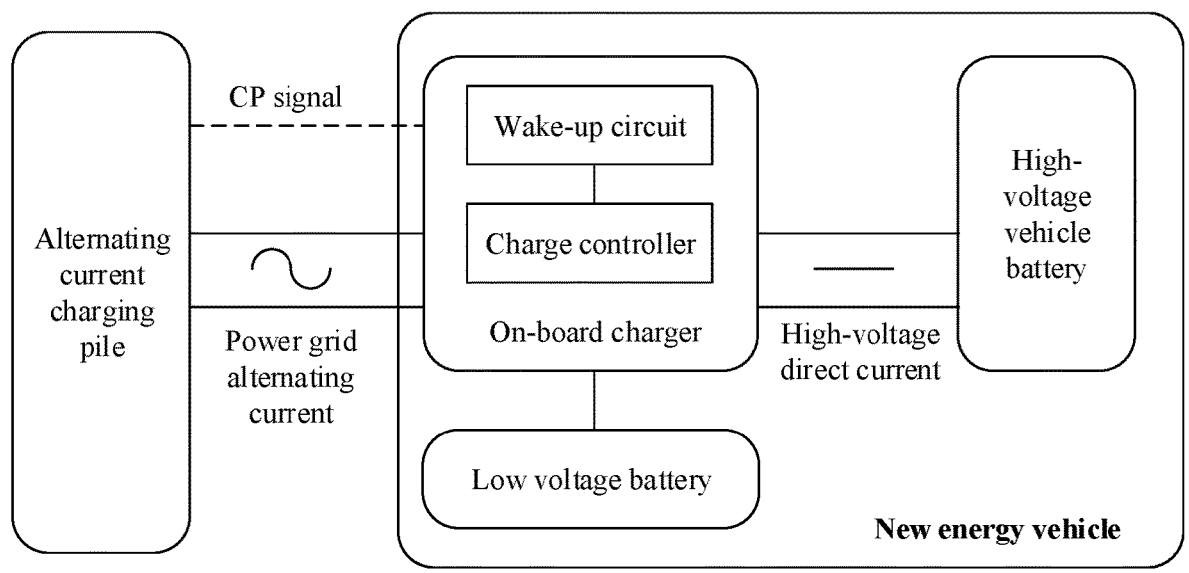
FIG. 1a is a schematic diagram of an architecture of an on-board alternating current charging system according to this application.
Figure 1B:
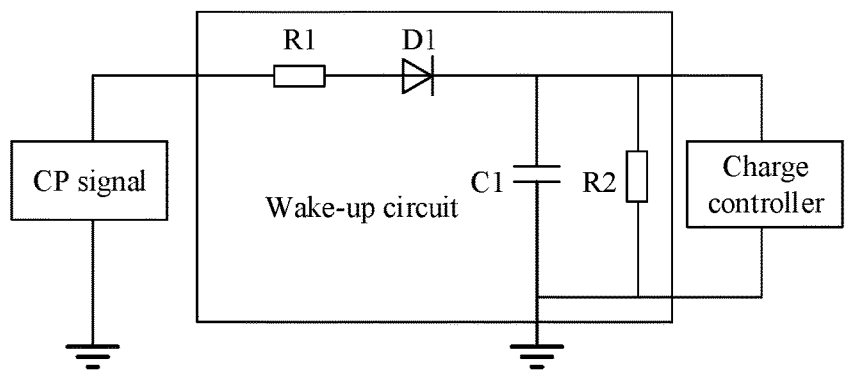
FIG. 1b is a schematic diagram of a structure of a wake-up circuit for a charge controller according to a conventional technology.
Figure 2:
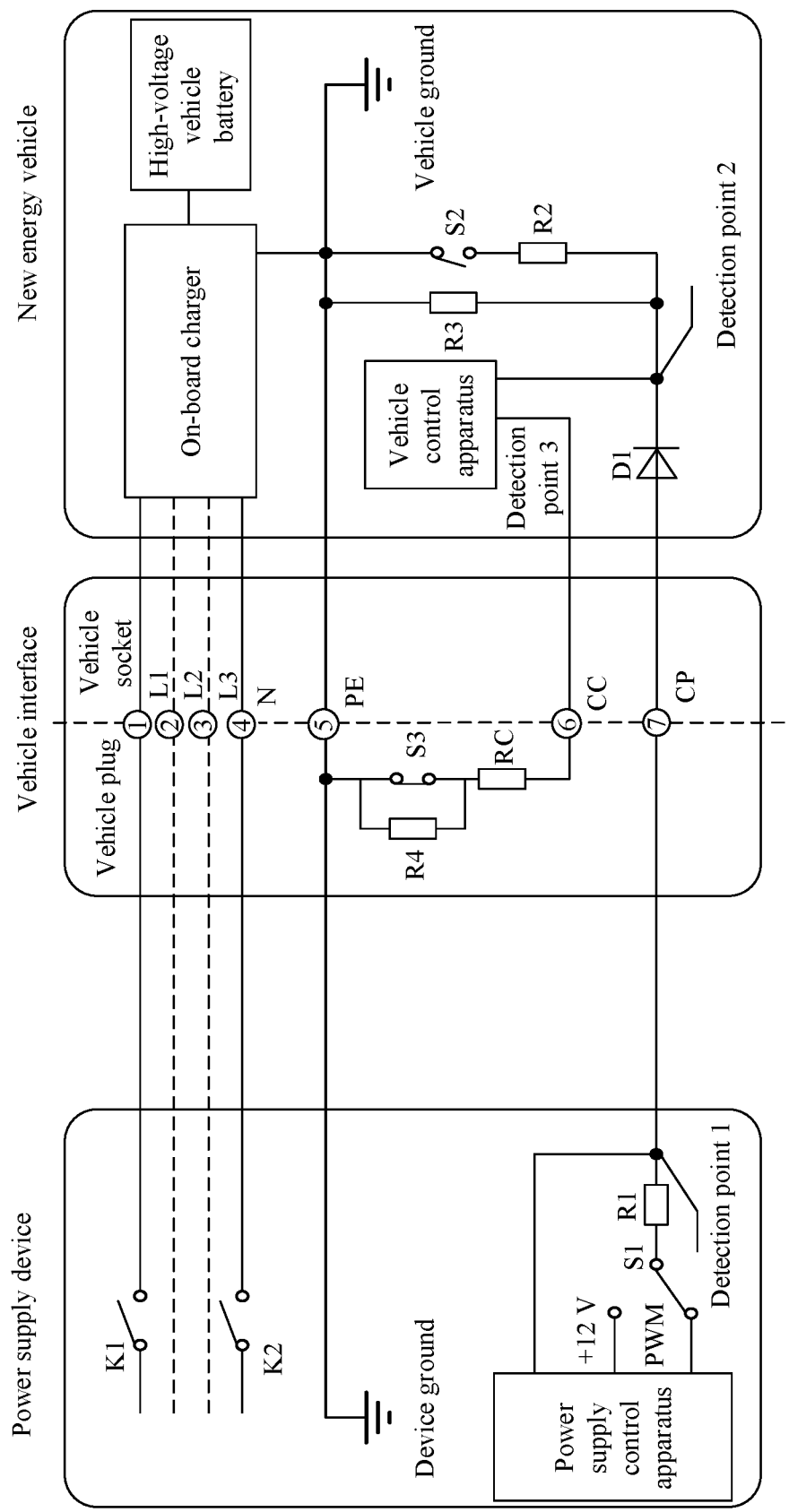
FIG. 2 is a schematic diagram of another architecture of an on-board alternating current charging system according to this application.

For ease of understanding of the solutions, the following first describes a charging process of a new energy vehicle with reference to FIG. 2. FIG. 2 is a schematic diagram of another architecture of an on-board alternating current charging system according to this application. As shown in FIG. 2, the on-board alternating current charging system includes a power supply device and a new energy vehicle. When charging cables (corresponding to ① to ② in FIG. 2) provided by the power supply device (for example, an alternating current charging pile) are not connected to a vehicle socket provided by the new energy vehicle, a voltage at CC is 12 V, and a value of a voltage at CP is 0 V. After a vehicle inlet is connected to the power supply device (that is, connected at ⑦), a switch S1 is connected to 12 V, and in this case, the voltage at the CP is 12 V. After a charging plug is inserted into a vehicle inlet, whether a voltage at a detection point 3 is 12 V is detected, to determine whether the charging plug is inserted into the vehicle inlet. If the voltage at the detection point 3 is no longer 12 V, it may be determined that the charging plug has been inserted into the vehicle inlet. A function of a resistor R4 is to detect whether the charging plug is properly inserted. If the charging plug is not properly inserted, a switch S3 (located in the charging plug) is disconnected. The resistor R4 and an RC form a serial loop. Therefore, an on-board charger can determine, by using the detection point 3, whether the charging plug is properly inserted. After the charging plug is inserted into the vehicle inlet, a 12 V voltage provided by a power supply control apparatus passes through S1 and R1, reaches a detection point 1 and a detection point 2 successively, then passes through R3, and finally is connected to ground. This forms a loop. In this case, a voltage at the detection point 1 and a voltage at the detection point 2 are no longer 12 V but 9 V. When the power supply control apparatus detects that the voltage at the detection point 1 is 9 V, the switch S1 is disconnected from the 12 V and connected to a PWM signal. In this case, a duty cycle signal that changes from 9 V to −12 V occurs at the detection point 1 and the detection point 2. It may be determined that the charging plug has been well connected. Subsequently, a switch S2 is closed, and the voltage at the detection point 2 changes from 9 V to 6 V in this case. Then, the on-board charger determines that charging can be performed. After a CP signal is stabilized at 6 V, relays K1 and K2 of the power supply device are closed, an alternating current provided by the power supply device is input to the on-board charger through the vehicle inlet, and the on-board charger converts the alternating current into a direct current to charge a high-voltage vehicle battery.

Figure 3:
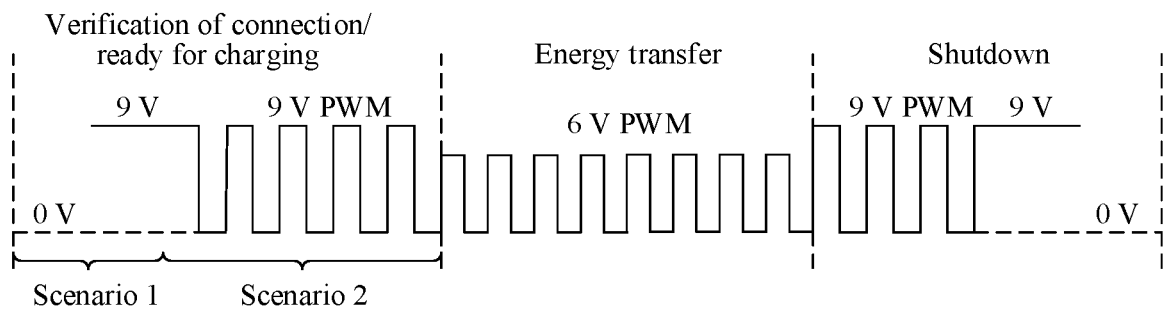
FIG. 3 is a schematic diagram of a sequence of a CP signal sent by a power supply device.

This application mainly describes an implementation process in which a wake-up circuit generates a rising edge signal starting from 0 based on a received CP signal to wake up a charge controller, in two scenarios: one scenario in which a charging plug is inserted for first-time charging, and the other scenario in which charging is performed again without unplugging and re-inserting a charging plug after charging interruption. For ease of description, refer to FIG. 3. FIG. 3 is a schematic diagram of a sequence of a CP signal sent by a power supply device. With reference to FIG. 2 and FIG. 3, it can be learned that the diagram of the sequence of the CP signal shown in FIG. 3 is also a power-on sequence diagram at the detection point 2 shown in FIG. 2. The power-on sequence diagram includes three phases: verification of connection/ready for charging, energy transfer, and shutdown. The scenario in which the charging plug is inserted for first-time charging in this application corresponds to scenario 1 in FIG. 3. To be specific, when the charging plug is not inserted into the vehicle inlet, an initial level signal at the detection point 2 is a low level signal (corresponding to a voltage of 0 V in scenario 1). After the charging plug is inserted into the vehicle inlet, the level signal at the detection point 2 changes from the low level signal to a 9 V high level signal. The scenario in which charging is performed again without unplugging and re-inserting a charging plug after charging interruption corresponds to scenario 2 in FIG. 3. To be specific, the initial level signal at the detection point 2 is a high level signal (corresponding to the 9 V high level signal in scenario 2). Then, the level signal at the detection point 2 changes from the 9 V high level signal to a 9 V PWM level signal.

Figure 4A:
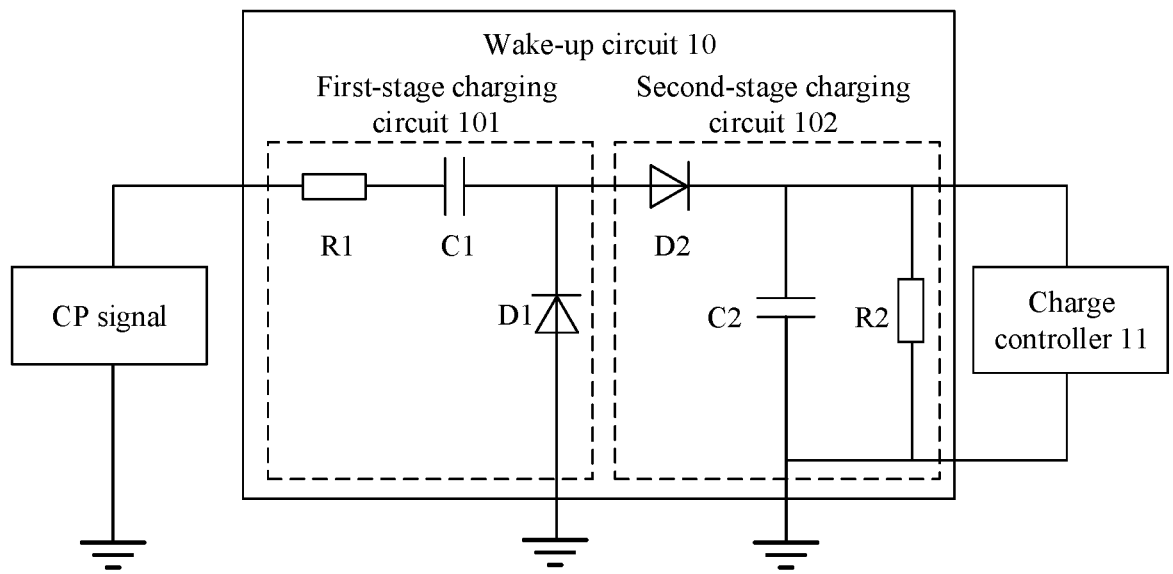
FIG. 4a is a schematic diagram of a structure of a wake-up circuit for a charge controller according to this application.

FIG. 4a is a schematic diagram of a structure of a wake-up circuit for a charge controller according to this application. As shown in FIG. 4a, the wake-up circuit 10 includes a first-stage charging circuit 101 and a second-stage charging circuit 102. An input terminal of the first-stage charging circuit 101 is coupled to an input terminal of the wake-up circuit 10, and an output terminal of the first-stage charging circuit 101 is connected to an input terminal of the second-stage charging circuit 102. An output terminal of the second-stage charging circuit 102 is coupled to an output terminal of the wake-up circuit 10 and then is connected to a charge controller 11.

The first-stage charging circuit 101 includes a first capacitor C1. Optionally, the first-stage charging circuit 101 may further include a first resistor R1 and a first diode D1. One terminal of the first resistor R1 is connected to the input terminal of the first-stage charging circuit 101, the other terminal of the first resistor R1 is connected to an anode of the first capacitor C1, a cathode of the first capacitor C1 is connected to both the output terminal of the first-stage charging circuit 101 and a cathode of the first diode D1, and an anode of the first diode D1 is connected to a reference ground. Optionally, the first capacitor includes M1 capacitors connected in series and/or in parallel, and the first resistor includes N1 resistors connected in series and/or in parallel, where both M1 and N1 are positive integers.

The second-stage charging circuit 102 includes a second capacitor C2. Optionally, the second-stage charging circuit 102 may further include a third diode D2 and a second resistor R2. An anode of the third diode D2 is connected to the input terminal of the second-stage charging circuit 102, a cathode of the third diode D2 is connected to both the output terminal of the second-stage charging circuit 102 and an anode of the second capacitor C2, a cathode of the second capacitor C2 is connected to the reference ground, and the second capacitor C2 is connected in parallel to the second resistor. Optionally, the second capacitor includes M2 capacitors connected in series and/or in parallel, and the second resistor includes N2 resistors connected in series and/or in parallel, where both M2 and N2 are positive integers.

In scenario 1, when a CP signal received by the input terminal of the first-stage charging circuit 101 from an alternating current charging pile is a second level signal (that is, a low level signal), both the first capacitor C1 and the second capacitor C2 are in an uncharged state. In this case, the second-stage charging circuit 102 outputs a low level signal (that is, a 0 V signal). Subsequently, when the CP signal received by the input terminal of the first-stage charging circuit 101 is a first level signal (that is, a high level signal), the first capacitor C1 starts to be charged along a charging path: R1, C1, D2, C2, and R2. To be specific, the first-stage charging circuit 101 outputs a first charging voltage to the second-stage charging circuit 102. When receiving the first charging voltage, the second-stage charging circuit 102 charges the second capacitor C2, and outputs a wake-up signal, that is, a rising edge signal starting from 0 V, to the charge controller 11.

It can be understood that, in scenario 1, initial states of the first capacitor C1 and the second capacitor C2 are both uncharged states. Therefore, when the input terminal of the first-stage charging circuit 101 receives a high level signal, because the high level signal has a charging effect on the first capacitor C1, a rising edge signal starting from 0 V is generated when a charging current of the first capacitor C1 flows through the second capacitor C2 and the second resistor R2.

In scenario 2, when the CP signal received by the input terminal of the first-stage charging circuit 101 is the first level signal (that is, a high level signal) and the first capacitor C1 is in a fully charged state, the wake-up circuit 10 is in a stable state. In other words, no current exists in the wake-up circuit 10. In view of this, the first-stage charging circuit 101 stops outputting the first charging voltage to the second-stage charging circuit 102. In this case, the second-stage charging circuit 102 no longer receives the first charging voltage output by the first-stage charging circuit 101. In other words, no current exists in the second-stage charging circuit 102. In this case, the second-stage charging circuit 102 outputs a low level signal (that is, a 0 V signal). Subsequently, when the CP signal received by the input terminal of the first-stage charging circuit 101 is a PWM level signal, because an initial part of the PWM signal is a low level signal, the first capacitor C1 is discharged along a discharging path: C1, R1, the CP signal, and the D1. In this case, still no current exists in the second-stage charging circuit 102, and further, the second-stage charging circuit 102 still outputs a low level signal (that is, a 0 V signal). Subsequently, when the low level signal of the PWM level signal at the input terminal of the first-stage charging circuit 101 changes to a high level signal, that is, when the input terminal of the first-stage charging circuit 101 receives the high level signal and the first capacitor C1 is in a partially charged state, the first capacitor C1 starts to be charged again along the charging path: R1, C1, D2, C2, and R2. To be specific, the first-stage charging circuit 101 outputs the first charging voltage to the second-stage charging circuit 102 again. When receiving the first charging voltage, the second-stage charging circuit 102 charges the second capacitor C2, and outputs the wake-up signal, that is, the rising edge signal starting from 0 V, to the charge controller 11.

It can be understood that, in scenario 2, because the initial state of the first capacitor C1 is a fully charged state, an output voltage of the wake-up circuit 10 is 0 V in this case. When the input terminal of the first-stage charging circuit 101 receives the PWM level signal whose initial part is a low level signal, the first capacitor C1 first discharges at a low level signal. In this case, the output voltage of the wake-up circuit 10 is still 0 V. Then, a high level signal charges the first capacitor C1, so that a rising edge signal starting from 0 V is generated when the charging current of the first capacitor C1 flows through the second capacitor C2 and the second resistor R2.

In this embodiment of this application, the wake-up circuit 10 detects the CP signal received by the input terminal of the wake-up circuit 10. Regardless of whether the CP signal changes from a low level signal to a high level signal or changes from a high level signal to a PWM level signal, the wake-up circuit 10 may output a rising edge signal starting from 0 V. This increases a scenario coverage of the wake-up circuit 10 to ensure high applicability.

Figure 4B:
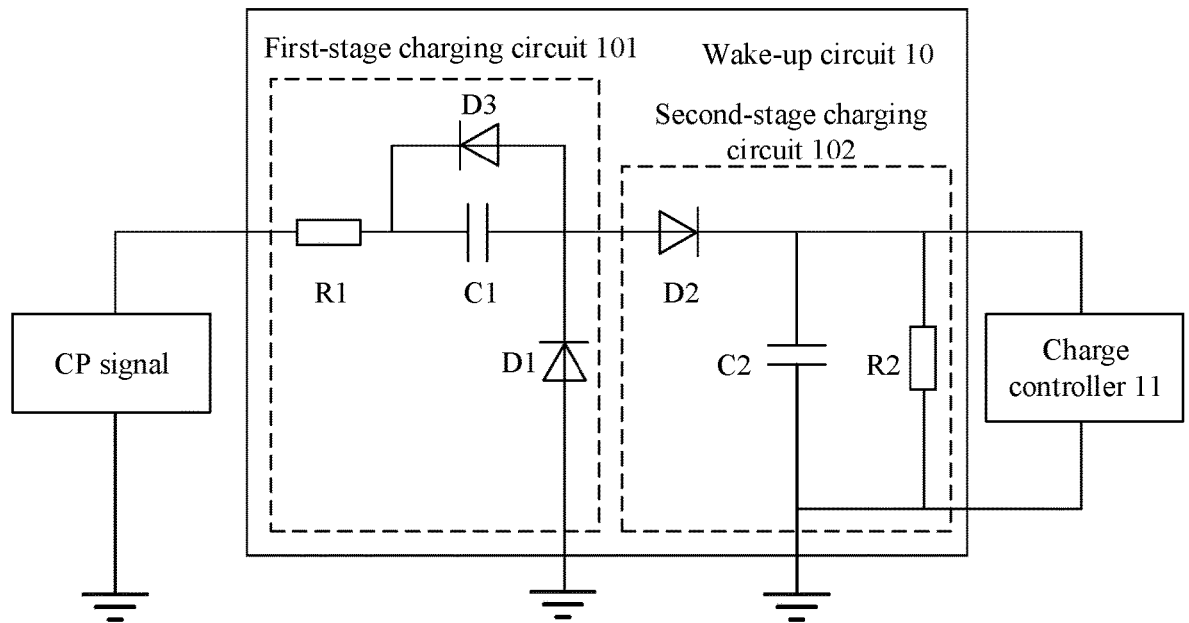
FIG. 4b is a schematic diagram of another structure of a wake-up circuit for a charge controller according to this application.

Further, the first-stage charging circuit 101 in the wake-up circuit 10 shown in FIG. 4a may further include a second diode. For details, refer to a schematic diagram of another structure of a wake-up circuit for a charge controller shown in FIG. 4b. As shown in FIG. 4b, a cathode of a second diode D3 is connected to the anode of the first capacitor C1, and an anode of the second diode D3 is connected to the cathode of the first capacitor C1, so that no negative voltage exists when the first capacitor C1 is discharged.

Herein, specific implementations in which the wake-up circuit 10 shown in FIG. 4b outputs a wake-up signal in scenario 1 and scenario 2 are respectively consistent with specific implementations in which the wake-up circuit 10 shown in FIG. 4a outputs a wake-up signal in scenario 1 and scenario 2. Details are not described herein again.

In this embodiment of this application, the wake-up circuit 10 detects a CP signal received by the input terminal of the wake-up circuit 10. Regardless of whether the CP signal changes from a low level signal to a high level signal or changes from a high level signal to a PWM level signal, the wake-up circuit 10 may output a rising edge signal starting from 0 V. This increases a scenario coverage of the wake-up circuit 10 to ensure high applicability.

Figure 5A:
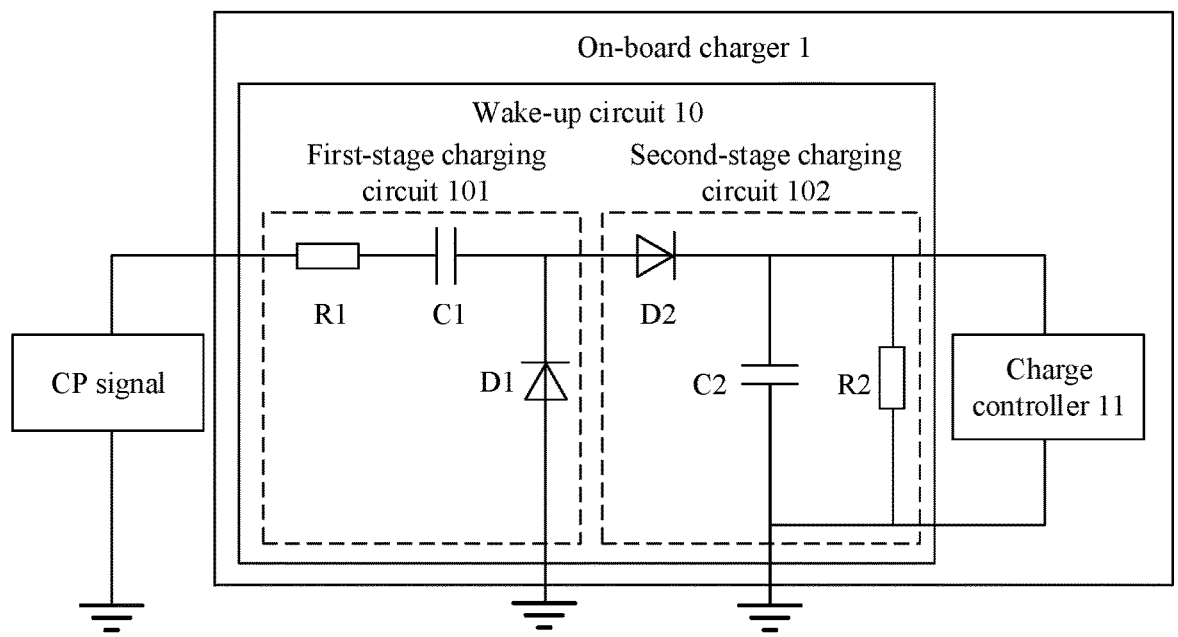
FIG. 5a is a schematic diagram of a structure of an on-board charger according to this application.

FIG. 5a is a schematic diagram of a structure of an on-board charger according to this application. As shown in FIG. 5a, the on-board charger 1 includes a wake-up circuit 10 and a charge controller 11. An input terminal of the wake-up circuit 10 is coupled to an input terminal of the on-board charger 1, and an output terminal of the wake-up circuit 10 is connected to an input terminal of the charge controller 11. The wake-up circuit 10 includes a first-stage charging circuit 101 and a second-stage charging circuit 102. An input terminal of the first-stage charging circuit 101 is coupled to an input terminal of the wake-up circuit 10, and an output terminal of the first-stage charging circuit 101 is connected to an input terminal of the second-stage charging circuit 102. An output terminal of the second-stage charging circuit 102 is coupled to the output terminal of the wake-up circuit 10 and then is connected to the input terminal of the charge controller 11.

The first-stage charging circuit 101 includes a first capacitor C1. Optionally, the first-stage charging circuit 101 may further include a first resistor R1 and a first diode D1. One terminal of the first resistor R1 is connected to the input terminal of the first-stage charging circuit 101, the other terminal of the first resistor R1 is connected to an anode of the first capacitor C1, a cathode of the first capacitor C1 is connected to both the output terminal of the first-stage charging circuit 101 and a cathode of the first diode D1, and an anode of the first diode D1 is connected to a reference ground. Optionally, the first capacitor includes M1 capacitors connected in series and/or in parallel, and the first resistor includes N1 resistors connected in series and/or in parallel, where both M1 and N1 are positive integers.

The second-stage charging circuit 102 includes a second capacitor C2. Optionally, the second-stage charging circuit 102 may further include a third diode D2 and a second resistor R2. An anode of the third diode D2 is connected to the input terminal of the second-stage charging circuit 102, a cathode of the third diode D2 is connected to both the output terminal of the second-stage charging circuit 102 and an anode of the second capacitor C2, a cathode of the second capacitor C2 is connected to the reference ground, and the second capacitor C2 is connected in parallel to the second resistor. Optionally, the second capacitor includes M2 capacitors connected in series and/or in parallel, and the second resistor includes N2 resistors connected in series and/or in parallel, where both M2 and N2 are positive integers.

Herein, specific implementations in which the wake-up circuit 10 outputs a wake-up signal in scenario 1 and scenario 2 are respectively consistent with specific implementations in which the wake-up circuit 10 shown in FIG. 4a outputs a wake-up signal in scenario 1 and scenario 2. Details are not described herein again.

Subsequently, after receiving the wake-up signal output by the wake-up circuit 10, the charge controller 11 is woken up based on the wake-up signal, and charges a high-voltage vehicle battery based on a charging control signal sent by an alternating current charging pile. Specifically, the charge controller 11 may determine, based on a size of a duty cycle of a PWM level signal included in the charging control signal, a value of a charging current output to the high-voltage vehicle battery.

In this embodiment of this application, the wake-up circuit 10 detects a CP signal received by the input terminal of the wake-up circuit 10. Regardless of whether the CP signal changes from a low level signal to a high level signal or changes from a high level signal to a PWM level signal, the wake-up circuit 10 may output a rising edge signal starting from 0 V, thereby ensuring that the charge controller 11 is effectively woken up. In other words, the wake-up circuit 10 can effectively wake up the charge controller 11 when a charging plug is inserted, and can further effectively wake up the charge controller 11 without unplugging and re-inserting the charging plug after charging fails. This can avoid a case in which charging can be performed only when the charging plug is unplugged and re-inserted after charging interruption, thereby increasing a scenario coverage of the on-board charger 1 and improving user experience to ensure high applicability.

Figure 5B:
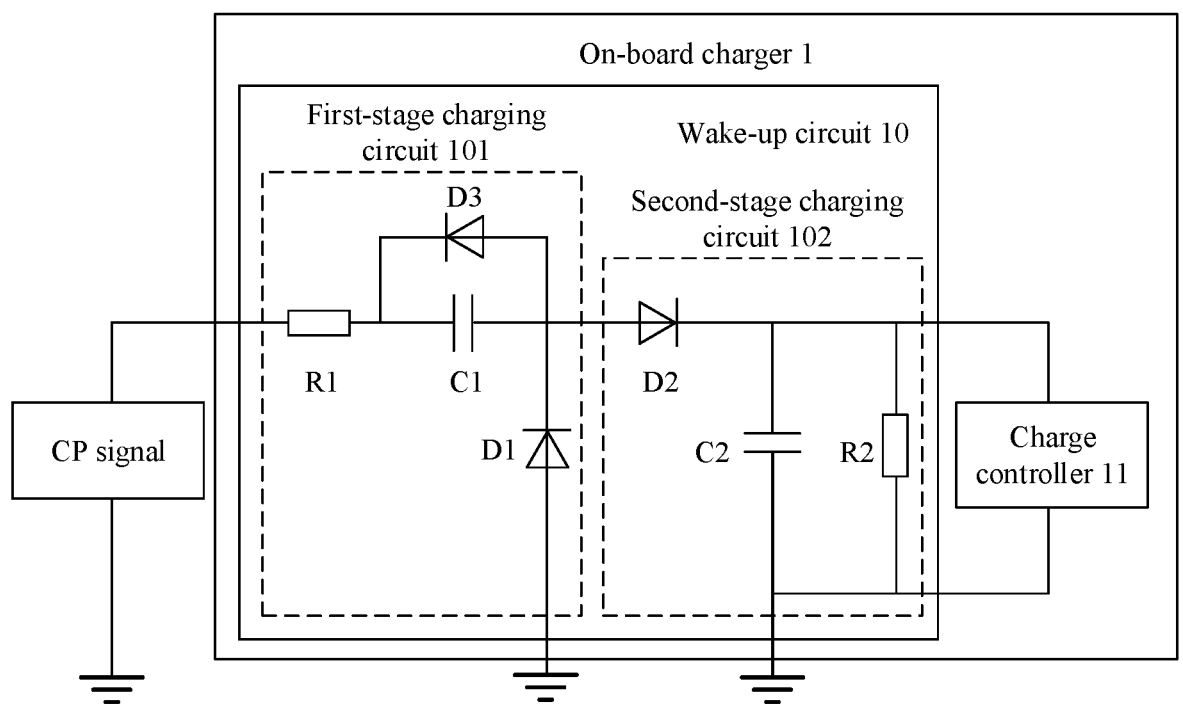
FIG. 5b is a schematic diagram of another structure of an on-board charger according to this application.

Further, the first-stage charging circuit 101 in the on-board charger 1 shown in FIG. 5a may further include a second diode. For details, refer to a schematic diagram of another structure of the on-board charger shown in FIG. 5b. As shown in FIG. 5b, a cathode of a second diode D3 is connected to the anode of the first capacitor C1, and an anode of the second diode D3 is connected to the cathode of the first capacitor C1, so that no negative voltage exists when the first capacitor C1 is discharged.

Herein, specific implementations in which the wake-up circuit 10 shown in FIG. 5b outputs a wake-up signal in scenario 1 and scenario 2 are respectively consistent with specific implementations in which the wake-up circuit 10 shown in FIG. 4a outputs a wake-up signal in scenario 1 and scenario 2. Details are not described herein again.

Subsequently, after receiving a wake-up signal output by the wake-up circuit 10, the charge controller 11 is woken up based on the wake-up signal, and charges a high-voltage vehicle battery based on a charging control signal sent by an alternating current charging pile.

In this embodiment of this application, the wake-up circuit 10 detects a CP signal received by the input terminal of the wake-up circuit 10. Regardless of whether the CP signal changes from a low level signal to a high level signal or changes from a high level signal to a PWM level signal, the wake-up circuit 10 may output a rising edge signal starting from 0 V, thereby ensuring that the charge controller 11 is effectively woken up. In other words, the wake-up circuit 10 can effectively wake up the charge controller 11 when a charging plug is inserted, and can further effectively wake up the charge controller 11 without unplugging and re-inserting the charging plug after charging fails. This can avoid a case in which charging can be performed only when the charging plug is unplugged and re-inserted after charging interruption, thereby increasing a scenario coverage of the on-board charger 1 and improving user experience to ensure high applicability.

Figure 6:
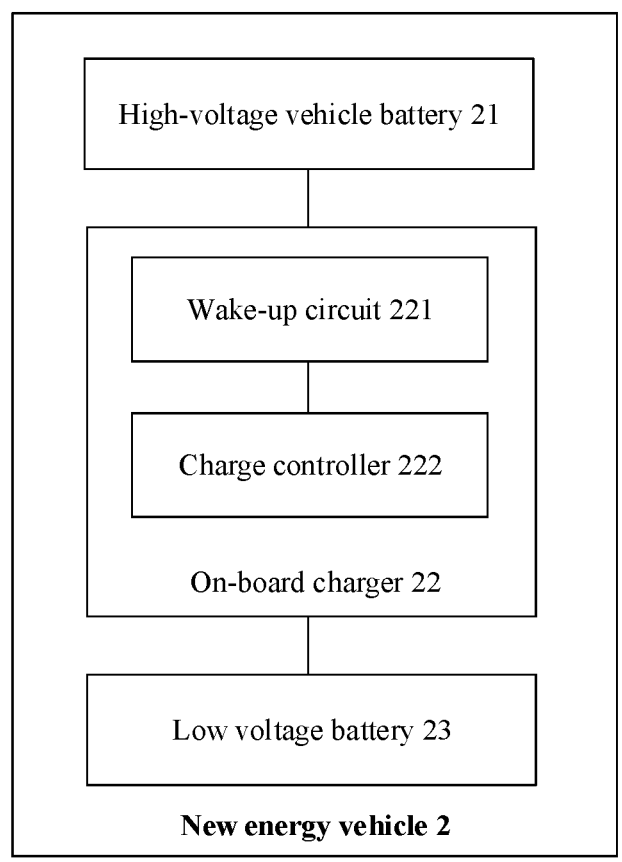
FIG. 6 is a schematic diagram of a structure of a new energy vehicle according to this application.

FIG. 6 is a schematic diagram of a structure of a new energy vehicle according to this application. As shown in FIG. 6, the new energy vehicle 2 includes a high-voltage vehicle battery 21, an on-board charger 22, and a low voltage battery 23. An input terminal of the on-board charger 22 is connected to the low voltage battery 23, and an output terminal of the on-board charger 22 is connected to the high-voltage vehicle battery 21. The on-board charger 22 includes a wake-up circuit 221 and a charge controller 222. An input terminal of the wake-up circuit 221 is connected to another input terminal of the on-board charger 22, and an output terminal of the wake-up circuit 221 is connected to the charge controller 222.

Herein, the wake-up circuit 221 may be the wake-up circuit 10 shown in FIG. 4a, or may be the wake-up circuit 10 shown in FIG. 4b. Specific implementations in which the wake-up circuit 221 outputs a wake-up signal in scenario 1 and scenario 2 are respectively consistent with specific implementations in which the wake-up circuit 10 shown in FIG. 4a outputs a wake-up signal in scenario 1 and scenario 2. Details are not described herein again.

Subsequently, after receiving the wake-up signal output by the wake-up circuit 221, the charge controller 222 is woken up based on the wake-up signal, and charges the high-voltage vehicle battery 21 based on a charging control signal sent by an alternating current charging pile. Specifically, the charge controller 222 may determine, based on a size of a duty cycle of a PWM level signal included in the received charging control signal sent by the alternating current charging pile, a value of a charging current output to the high-voltage vehicle battery 21, to implement charging of the new energy vehicle 2.

In this embodiment of this application, the wake-up circuit 221 detects a CP signal received by the input terminal of the wake-up circuit 221. Regardless of whether the CP signal changes from a low level signal to a high level signal or changes from a high level signal to a PWM level signal, the wake-up circuit 221 may output a rising edge signal starting from 0 V, thereby ensuring that the charge controller 222 is effectively woken up. This increases a scenario coverage of the wake-up circuit 221, further reduces power consumption of the low voltage battery, increases idle time of the vehicle, to ensure high applicability.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wake-up circuit for a charge controller, wherein the wake-up circuit comprises a first-stage charging circuit and a second-stage charging circuit, wherein the first-stage charging circuit comprises a first capacitor, an input terminal of the first-stage charging circuit is coupled to an input terminal of the wake-up circuit, and an output terminal of the first-stage charging circuit is coupled to an input terminal of the second-stage charging circuit; and the first-stage charging circuit is configured to: in response to the input terminal of the first-stage charging circuit receiving a first level signal and the first capacitor being in a partially charged state, charge the first capacitor, and output a first charging voltage to the second-stage charging circuit; or the first-stage charging circuit is configured to: in response to the input terminal of the first-stage charging circuit receiving a second level signal, discharge the first capacitor; and the first-stage charging circuit further comprises a first diode, wherein one terminal of the first capacitor is coupled to an input terminal of the first-stage charging circuit, the other terminal of the first capacitor is connected to both the output terminal of the first-stage charging circuit and a cathode of the first diode, and an anode of the first diode is connected to a reference ground; and the second-stage charging circuit comprises a second capacitor, an output terminal of the second-stage charging circuit is coupled to an output terminal of the wake-up circuit and connected to the charge controller; and the second-stage charging circuit is configured to: in response to the second-stage charging circuit receiving the first charging voltage output by the first-stage charging circuit, charge the second capacitor and output a wake-up signal to the charge controller, wherein the wake-up signal is used to wake up the charge controller, and the charge controller is configured to charge a high-voltage vehicle battery in response to a charging control signal.

2. The wake-up circuit according to claim 1, wherein the input terminal of the wake-up circuit is connected to an alternating current charging pile, and the wake-up circuit is configured to receive the first level signal or the second level signal sent by the alternating current charging pile.

3. The wake-up circuit according to claim 1, wherein the first-stage charging circuit further comprises a second diode, a cathode of the second diode is connected to one terminal of the first capacitor, and an anode of the second diode is connected to the other terminal of the first capacitor.

4. The wake-up circuit according to claim 1, wherein the first-stage charging circuit further comprises a first resistor, one terminal of the first resistor is connected to one terminal of the first capacitor, and the other terminal of the first resistor is connected to the input terminal of the first-stage charging circuit.

5. The wake-up circuit according to claim 4, wherein the first resistor comprises N1 resistors connected in series and/or in parallel, wherein N1 is a positive integer.

6. The wake-up circuit according to claim 1, wherein the first capacitor comprises M1 capacitors connected in series and/or in parallel, wherein M1 is a positive integer.

7. The wake-up circuit according to claim 1, wherein the second-stage charging circuit further comprises a third diode, an anode of the third diode is connected to the input terminal of the second-stage charging circuit, and a cathode of the third diode is connected to both the output terminal of the second-stage charging circuit and one terminal of the second capacitor.

8. The wake-up circuit according to claim 7, wherein the second-stage charging circuit further comprises a second resistor, and two terminals of the second resistor are respectively connected to two terminals of the second capacitor.

9. The wake-up circuit according to claim 8, wherein the second resistor comprises N2 resistors connected in series and/or in parallel, wherein N2 is a positive integer.

10. The wake-up circuit according to claim 1, wherein the second capacitor comprises M2 capacitors connected in series and/or in parallel, wherein M2 is a positive integer.

11. The wake-up circuit according to claim 1, wherein the first level signal is a high level signal in a pulse width modulation (PWM) level signal, and the second level signal is a low level signal in the PWM level signal.

12. An on-board charger, wherein an input terminal of the on-board charger is connected to an alternating current charging pile, an output terminal of the on-board charger is connected to a high-voltage vehicle battery, the on-board charger comprises a wake-up circuit for a charge controller, wherein the wake-up circuit comprises a first-stage charging circuit and a second-stage charging circuit, wherein the first-stage charging circuit comprises a first capacitor, an input terminal of the first-stage charging circuit is coupled to an input terminal of the wake-up circuit, and an output terminal of the first-stage charging circuit is coupled to an input terminal of the second-stage charging circuit; and the first-stage charging circuit is configured to: in response to the input terminal of the first-stage charging circuit receiving a first level signal and the first capacitor being in a partially charged state, charge the first capacitor, and output a first charging voltage to the second-stage charging circuit; or the first-stage charging circuit is configured to: in response to the input terminal of the first-stage charging circuit receiving a second level signal, discharge the first capacitor;

the first-stage charging circuit further comprises a first diode, wherein one terminal of the first capacitor is coupled to an input terminal of the first-stage charging circuit, the other terminal of the first capacitor is connected to both the output terminal of the first-stage charging circuit and a cathode of the first diode, and an anode of the first diode is connected to a reference ground;

the second-stage charging circuit comprises a second capacitor, an output terminal of the second-stage charging circuit is coupled to an output terminal of the wake-up circuit and connected to the charge controller; and the second-stage charging circuit is configured to: in response to the second-stage charging circuit receiving the first charging voltage output by the first-stage charging circuit, charge the second capacitor and output a wake-up signal to the charge controller, wherein the wake-up signal is used to wake up the charge controller, and the charge controller is configured to charge a high-voltage vehicle battery in response to a charging control signal; and an input terminal of the wake-up circuit is coupled to the input terminal of the on-board charger, and an output terminal of the charge controller is coupled to the output terminal of the on-board charger.

13. The on-board charger according to claim 12, wherein the input terminal of the wake-up circuit is connected to an alternating current charging pile, and the wake-up circuit is configured to receive the first level signal or the second level signal sent by the alternating current charging pile.

14. The on-board charger according to claim 12, wherein the first-stage charging circuit further comprises a second diode, a cathode of the second diode is connected to one terminal of the first capacitor, and an anode of the second diode is connected to the other terminal of the first capacitor.

15. A new energy vehicle, comprising: an on-board charger, a high-voltage vehicle battery and a low-voltage battery, wherein an input terminal of the on-board charger is connected to the low-voltage battery, an output terminal of the on-board charger is connected to the high-voltage vehicle battery, and the on-board charger comprises a wake-up circuit for a charge controller, wherein the wake-up circuit comprises a first-stage charging circuit and a second-stage charging circuit, wherein the first-stage charging circuit comprises a first capacitor, an input terminal of the first-stage charging circuit is coupled to an input terminal of the wake-up circuit, and an output terminal of the first-stage charging circuit is coupled to an input terminal of the second-stage charging circuit; and the first-stage charging circuit is configured to: in response to the input terminal of the first-stage charging circuit receiving a first level signal and the first capacitor being in a partially charged state, charge the first capacitor, and output a first charging voltage to the second-stage charging circuit; or the first-stage charging circuit is configured to: in response to the input terminal of the first-stage charging circuit receiving a second level signal, discharge the first capacitor;

the first-stage charging circuit further comprises a first diode, wherein one terminal of the first capacitor is coupled to an input terminal of the first-stage charging circuit, the other terminal of the first capacitor is connected to both the output terminal of the first-stage charging circuit and a cathode of the first diode, and an anode of the first diode is connected to a reference ground;

the second-stage charging circuit comprises a second capacitor, an output terminal of the second-stage charging circuit is coupled to an output terminal of the wake-up circuit and connected to the charge controller; and the second-stage charging circuit is configured to: when the second-stage charging circuit receives the first charging voltage output by the first-stage charging circuit, charge the second capacitor and output a wake-up signal to the charge controller, wherein the wake-up signal is used to wake up the charge controller, and the charge controller is configured to charge a high-voltage vehicle battery in response to a charging control signal; and an input terminal of the wake-up circuit is coupled to the input terminal of the on-board charger, and an output terminal of the charge controller is coupled to the output terminal of the on-board charger.

16. The new energy vehicle according to claim 15, wherein the input terminal of the wake-up circuit is connected to an alternating current charging pile, and the wake-up circuit is configured to receive the first level signal or the second level signal sent by the alternating current charging pile.

17. The new energy vehicle according to claim 15, wherein the first-stage charging circuit further comprises a second diode, a cathode of the second diode is connected to one terminal of the first capacitor, and an anode of the second diode is connected to the other terminal of the first capacitor.

* * * * *